US005743502A

United States Patent [19]

Humma

[11] Patent Number: 5,743,502

[45] Date of Patent: Apr. 28, 1998

[54] BENCH VICE SUPPORT PLATFORM

[76] Inventor: Gary Lee Humma, 1406 Fredrick Blvd., Reading, Pa. 19605

[21] Appl. No.: 783,365

[22] Filed: Jan. 16, 1997

[51] Int. Cl.[6] .................... B23Q 1/25

[52] U.S. Cl. .................... 248/231.31; 269/79; 269/99

[58] Field of Search .................... 248/231.31, 231.51, 248/228.2, 228.4, 229.11, 229.13; 269/79, 74, 67, 68, 99

[56] References Cited

U.S. PATENT DOCUMENTS 2,697,462 12/1954 Connor .................... 269/99

*Primary Examiner*—Alvin C. Chin-Shue
*Assistant Examiner*—Long Dinh Phan
*Attorney, Agent, or Firm*—Arthur R. Eglington

[57] ABSTRACT

A displaceable bench vice support means consisting of a two-component bench-mounted device, the first component is a handle means of a rectangular configuration cooperating to lock with a rigid planar component that is also provided with a peripheral depending skirt, which skirt supports the bench vise readily on the work table. This support device is handily released to permit stowing away of bench vise and the support means until again needed.

5 Claims, 3 Drawing Sheets

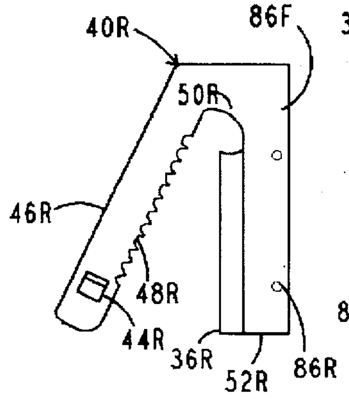
FIG. 5R
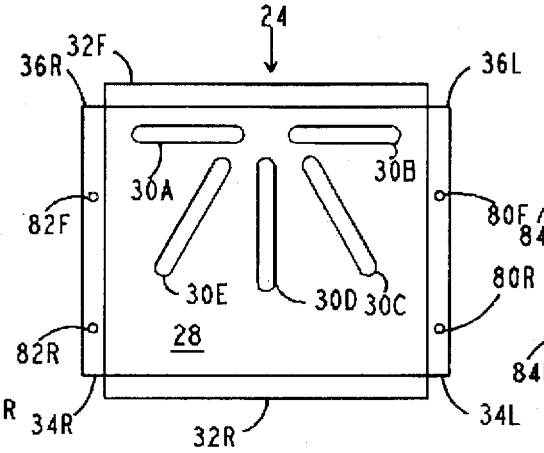
FIG. 5C
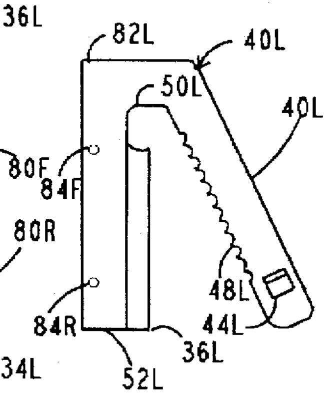
FIG. 5L
FIG. 7
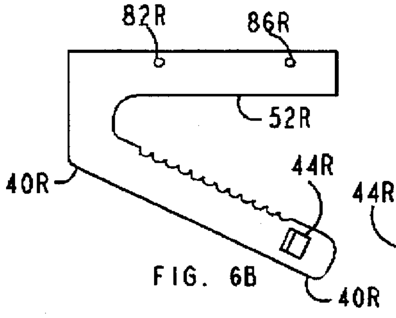
FIG. 6B
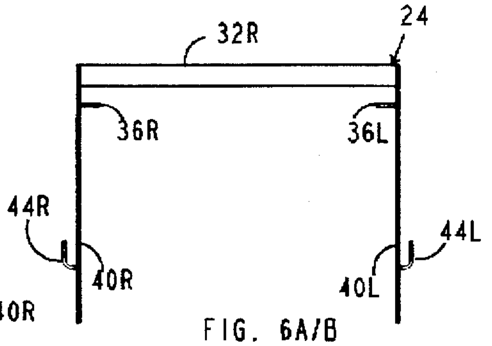
FIG. 6A/B

BENCH VICE SUPPORT PLATFORM

BACKGROUND OF THE INVENTION

This invention relates generally to an anchoring apparatus for supporting a bench tool. The invention relates more particularly to an improvement in a displaceable support device for securing a standard adjustable jaws vice into a work bench edge.

Bench vices are long known for holding work piece devices during shaping, cutting, finishing, and the like. Usually, bench vices are permanently affixed to a work bench or table. If a person seeks to have the entire work bench surface available for a task, this is precluded by the obtrusive location of the bench device. It is cumbersome, if not wholly impractical, to then disconnect the vice-retaining bolts each time an uncluttered work bench surface is needed.

SUMMARY OF THE INVENTION

It is a principal object of this invention to provide a dependable vice-mounting means for work bench surfaces which can handily be displaced from that surface when the vice itself is not to be in use, and instead, presents an operating impediment.

It is another object to provide a discrete vice mounting platform that is quickly anchored upon the work bench edge and permits facile attachment of the vice member to it, as needed.

A still further object of the invention is to obviate the practice of having standard work bench vices permanently protruding from a table worktop at all times.

It is yet another object is to provide an economical accessory that serves as the displaceable anchoring means between a work bench and often, but only intermittently needed, bench tool, like a vice.

A still further object of the invention is to provide a vice support means which can be assembled from two separately machined work pieces, which are fabricated well within the skill of the art, to provide art economical two component, vice mounting device.

In accordance with the features and advantages of this invention, there is provided a two component, bench-mounted device serving as a displaceable anchoring platform for a heavy bench vice. The device first comprises a handle member presenting a substantially rectangular configuration when in its assembled mode, which includes elongate, rigid opposing sidewalls. At one set of the opposing longitudinal ends is an anchoring element comprising a rigid bar located spanning the sidewalls at what comprises the functional lower longitudinal end of the handle member. At the other pair of sidewall upper longitudinal ends, there is provided a spanning, rigid spindle element, being pivotally supported between the sidewalls at their upper ends. Offset from the sidewall upper ends and proximal thereto, are a pair of opposing rounded knobs with recessed annular channels (one knob in each sidewall) serving as detent devices with each knob fixedly located and oriented inwardly in an axial alignment. These knobs provide the functioning contact points with the other device component of the invention, a vice platform member, now to be described.

Vice support platform member consists primarily of a rigid planar component of a generally rectangular configuration, and which is provided with a peripheral depending skirt that is adapted to maintain the planar component somewhat spaced apart from the work bench surface. This spacing is needed to accommodate the bolt heads of the bolts, which are used to fasten the platform member to the under surface of the device base itself. The platform member is provided with identical bracket-like sidewall components (broadly U-shaped when seen in profile), with the brackets also being oriented at a substantially 90° angle to the planar component. Each platform sidewall in the operating position comprises a three segment, linear element. The first linear segment, as noted, is conjoined with one platform linear edge, or is an integral element with its adjoining platform lateral edge, the linear middle segment is at right (or slightly obtuse) angles to each of the other two segments and provides a spatial gap therebetween, corresponding at its inner span to the largest depth of a support ledge expected.

The third segment is configured so as to present a diverging angle from its inner end to its free end, so that each of the sidewalls presents a symmetrical diverging gap. Thusly, the sidewall component in profile presents a variable gap between its open ends and its inner linked ends which enclose the workbench ledge.

An array of abutting linear serrations are provided along the inner edge only of each of said diverging sidewall third segments. These serrations are adapted to engage in a transient manner, the aforedescribed hobs, which are mounted inwardly of the opposing sidewalls of the handle member. By manually traveling (rocking) along the serrated edges, the handle member finally achieves a position which locks the spindle element thereof rigidly along the undersurface of the support bench. The platform, and its appended and bolted vice base, are now in an anchored position, suitable for customary workshop use of the vice.

DESCRIPTION OF THE DRAWING

FIGS. 5L/C/R depicts the three-element vice support member workpiece that upon suitable forming and riveting, comprises both the vise platform support component, and with its U-shaped side elements, presents the support bench engaging jaws component of lower FIG. 1.

FIGS. 6A/B presents an alternate view of the platform support member of FIG. 5 showing a front and side elevational view.

FIG. 7 is an enlarged view of the type of socket-head cap screw used to affix the U-shaped bracket elements to the vice support member.

DETAILED DESCRIPTION OF THE PREFERRED EMBODIMENTS

Figure 1:
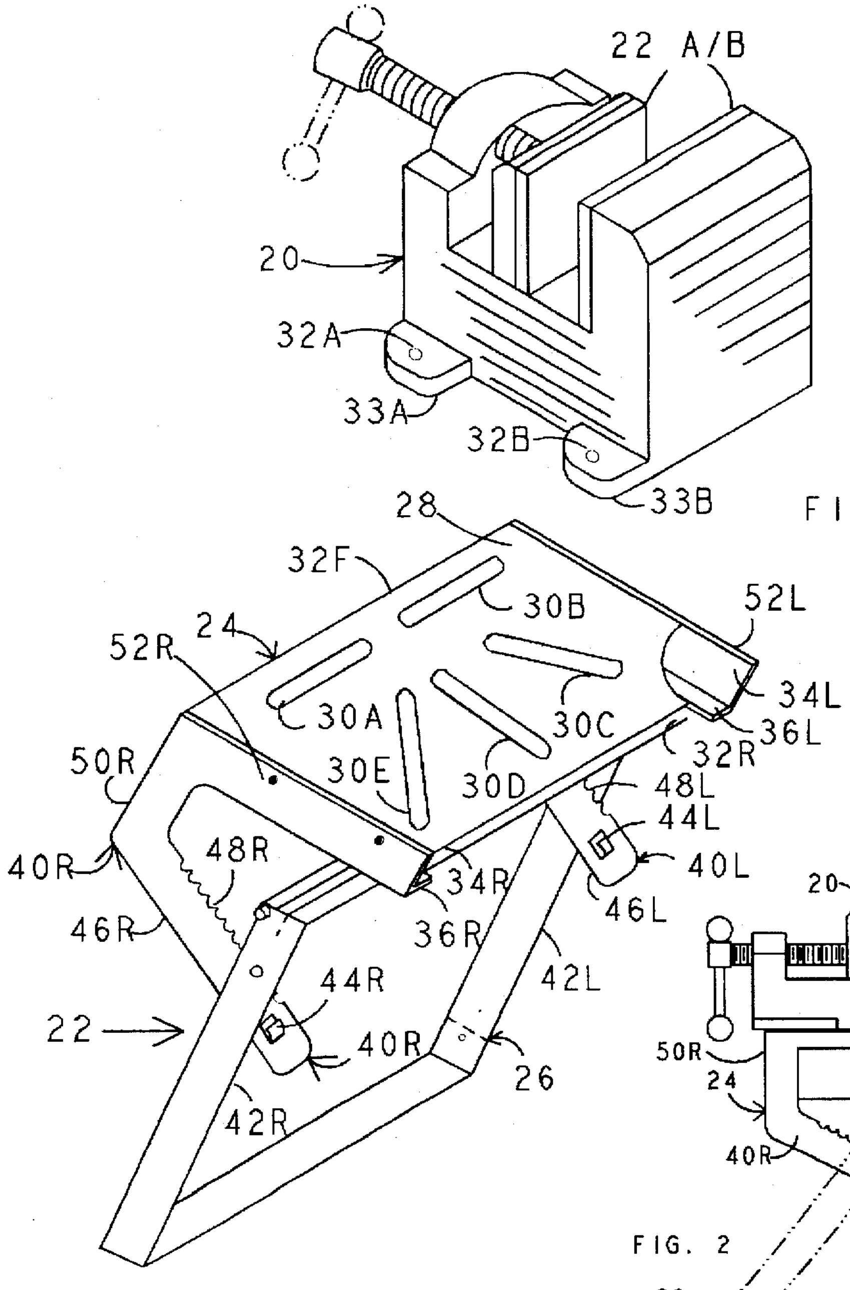
FIG. 1 is a perspective view of the complete support platform of the present invention shown positioned below a standard, adjustable jaws, bench vise that is about to be mounted thereupon, but is seen spaced-apart from the vise itself.

Referring now to the drawing, and to FIG. 1 in particular, there is depicted a typical bench vice 20 with adjustable jaws (22A/B), which vice can be usefully employed with the apparatus of the present invention. The lower depiction is of the assembled two-component apparatus, generally 24, of the present invention. This apparatus comprises an upper platform component 24, and a peripherally engaged, handle and locking component generally 26. Integral with the planar surface 28 of platform 24 are a plurality of linear slots, 30A–E, which are sized and arranged so as to permit the tapped bores, 32A/B, in rigid base tabs 33A and 33B, respectively, to be aligned over the platform component and to be secured thereto by standard machine bolts (not seen). The two linearly aligned slots 30A/B will anchor bore 32A, as well as its hidden side bore of the vice, while the radially aligned slots 30C/D/E provide for mounting of tabs having mounting bores of vices of varied bolt spread dimension.

The frontal and rearward edges of the platform component 24 are provided with depending skirts 32F/R. A similar pair of depending skirts, 34L/R, are provided on the lateral sides of planar element 28. These lateral skirts serve a dual function to be described. Generally, all four of the skirts, 32/34, serve to keep the vice platform somewhat elevated from the bench ledge (FIG. 2), which vertical gap works to accommodate the heads of the bolts (not seen) that are used to pin the support component to the vice borehole tabs 32A, 32B, etc.

The lateral side skirts, 34L/R are further provided with elongate inwardly projecting ledges, like 36L and 36R (seen in the right hand cutaway corner), which ledges present a stabilizing contact plane with the bench surface itself.

Depending from, and secured to, lateral, vertical edges 34L/R of the platform member 24 are broadly U-shaped, bench clamping, sidewall members 40L/R, which have their free lower elongate longitudinal ends (46L/R) positioned depending within the sidewalls 42L/R of handle member 26. Proximal to each free end of members 46L/R are cut-out tabs 44L/R, the function of which it to provide a hang-up notch during non-use.

The clamp (40L/R) upper legs and/or segments, 52L/R, are pinned fixedly to the lateral side skirts 34L/R of planar platform 24. Depending free legs 46L/R of sidewalls 40L/R are each provided with a linear array of abutting serrations, 48L/R, the function of which will be made apparent. The middle segments 50L/R of clamping members 40L/R provide the variable width gap 62 (FIG. 2) between the free end, down slanted segments 46L/R, and the upper segment 52L/R of the side mounted clamps (40L/R).

Alternately, the platform member 24 with the U-clamp components can be formed as an integral work piece, which could be stamped from a single metallic sheet blank. To accomplish this, the lateral skirts like 34L/R, and the underledges, like 36L/R (FIG. 1), would be omitted. Only the opposing skirts 32F/R could be provided as depending elements, thus keeping the needed, spaced apart disposition for planar surface 28 for reasons taught above.

Figure 2:
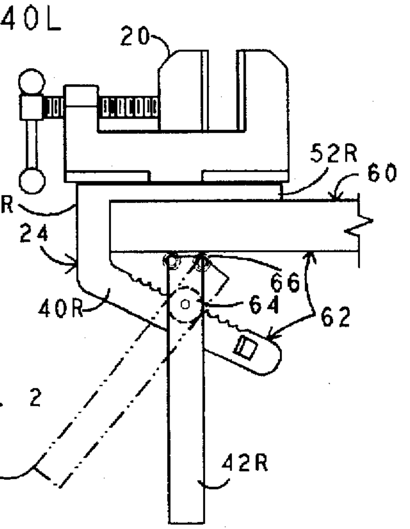
FIG. 2 is a side elevational, schematic view of the device of the invention, premounted upon a support table bench and also having the vise mounted thereon, with the locking handle shown in both of the traveling and ledge-locked modes.

Averting now to the side elevational view of FIG. 2, there is depicted a reduced scale view of the inventive apparatus 24, mounted on a work bench ledge 60, with the working vice 20 secured thereupon. The narrowed, variable gap 62 between the bench ledge and its underside 60U, on the one hand, and the opposing linear serrations 48R of free segment 46R, on the other hand, are now more apparent. Handle 26, which pivots on annular knob 64R, ascends the serrated ladder steps 48R, by a manually-imposed rocking motion. The upper transverse element of handle 26 is, in fact, an elongate, rigid spindle member 66, which is pivotally supported by the sidewalls (42R/L of the handle component). This action permits the upper spindle element 66 of the handle to roll along the undersurface 60U of ledge 60 (swinging from the vertical position to the inclined sliding position, both being depicted), until such vertical gap narrows so as to lock the handle spindle element 66 into the vertical position shown. When the platform is to be displaced, a forceful handle tug towards the vice user will suffice to break the locked position, and to facilitate the reverse downward travel of the handle component along serrations 48R, until the clamping force is eliminated. Then, the platform/vice combination can be lifted free of the bench for temporary storage.

Figure 3A:
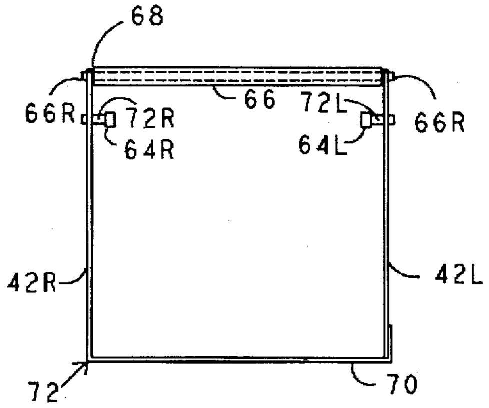
FIGS. 3A/B are side elevational and frontal views of the locking handle alone, depicting the pivot knobs on both sidewall elements, and the upper-end spanning spindle with support pins.
Figure 3B:
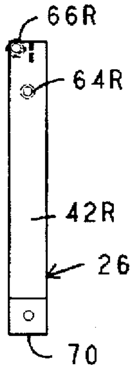
Figure 4B:
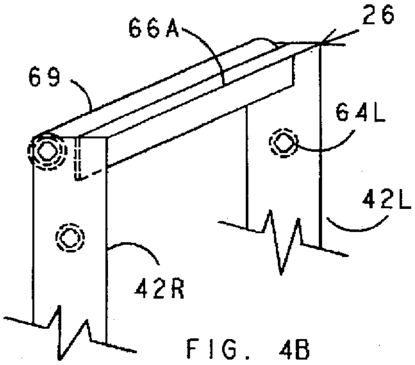
FIG. 4B is a perspective view of one upper end of the spindle end of the handle component depicting its configuration relative to the spanner support member.

The isolated handle component 26 is shown in the views of FIGS. 3A/B. Gripping bar 70 pins the lower ends of sidewall elements 42L/R. At the other transverse end of handle 26 is the rotatable spindle 66, with its axially protruding longitudinal ends 66A/B. Spindle 66 spans and fixes the gap at the handle upper end 68. Offset, but proximal, to the handle upper end, are the inwardly oriented pair of opposing knobs 64L/R, each of which is provided with a recessed, annular channel (72L/R), which channels roll over the linear serrations 40L/R, as the handle end is rocked back and forth. In FIG. 3B is an end elevational view of the assembled handle component 26.

Figure 4A:
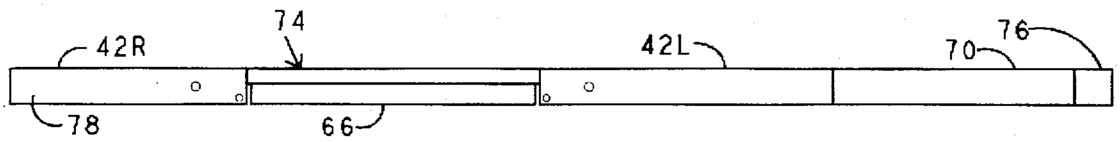
FIG. 4A depicts the prefabricated, unitary work piece that, upon suitable forming steps, comprises the assembled locking handle of FIGS. 3A/B, being shown isolated; and which handle is further shown in the working juxtapositions of FIG. 2.

A prefabricated workpiece 74 for handle shaping and assembly is depicted in FIG. 4A, which work piece is readily shaped by metal bending, and the like, into the handle assembly of FIG. 3A, but without the separately made spindle member 69. The end tab 76 on grippable segment 70 overlaps the other longitudinal end segment 78 of the workpiece, which becomes sidewall 42R. The end tab is tacked thereto by welding, or the like, to provide the substantially rectangular (and rigid) structure depicted in FIG. 3A. Rigid, right-angled elongate member 66 provides the spanner element for the upper ends of formed handle component 26.

Workpiece 74 is fabricated starting with 16 gauge×one inch wide flat stock, e.g., of 40 Rockwell scale hardness; tempered steel stock. A flat stock segment is of perhaps 33" in length which is hole-punched (for the platform attachment ports), and also punching the tab as well. It is fed into a multi-ton press to form the reinforcing spanning 66, which in practice provides the rigid support for the rotating spindle member 74. The spindle element itself is sized and cut from rod stock. It is mounted during assembly adjacent and parallel to spanner element 66.

Looking now to FIGS. 5L/C/R, there is depicted the major elements (pre-assembly) of the platform component 24 of FIGS. 1/2. In this particular embodiment, the three elements of the platform component 24 are fabricated separately. Actually, elements 40R and 40L are essentially identical except for the orientation of the tabular segment on one lateral edge, to be described, for rotation of their juxtaposition for mounting abutting planar element 28. The elongate adjacent segments on each lateral edge element 28 are later bent to form vertical skirts 34L/R, which abut and are coupled with U-bracket members 40L/R (FIG. 1), but all are here seen in planar view. The front and rear elongate segments 32F/R, will form the vertical skirts of the platform member 24, also depicted in planar view. Each of lateral skirt segments 36L/R is also provided with a pair of spaced-apart perforations, 80F/R and 82F/R, respectively.

Each of bracket members 40L/R is provided with integral elongate segments 38L/R, of the size dimensions of segments 36L/R/. These skirt perforations are aligned with equally spaced apart, pairs of perforations 84F/R and 86F/R, respectively, in clamping elements 40L/R, respectively. Suitable socket head cap screws (FIG. 7) will fasten the bracket clamp elements 82L/R to the platform skirt elements (36L/R) of member 24. Abutting, elongate segments 36L/R of elements 86L/R, provide the horizontal lateral skirts that contact the bench table. Their working juxtaposition is again seen in FIG. 1.

The bolt mounting slots, 30A/E (FIG. 5C) are pre-punched about the time of fabrication of the platform configuration depicted. This offset platform then presents itself as depicted in the assembly view of FIG. 1.

In FIG. 6A, is presented an end elevational view of the assembly 24, as it is oriented to be slipped over the bench ledge 60 of FIG. 2 (omitting for clarity the vice itself). In FIG. 6B is a side elevational view of the same platform component as it appears in the operational mode of FIG. 6A, again without the vice itself.

Various modifications of the described embodiment of the invention will become apparent to those skilled in the metal working arts and variations may be made to the depicted embodiment without departing from the spirit of the invention or falling outside the scope of the appended claims.

I claim:

1. An apparatus for securing a work bench tool to conventional work table supporting ledges in a dependable, but displaceable, manner during tool use, the apparatus comprising:

(a) a tool support member including a rigid planar component of a generally rectangular configuration and having a plurality of depending skirts located about its periphery of the rigid planar complement on at least two lateral edges of the rigid planar component, the lateral edge skirts being adapted to maintain the rigid planar component spaced apart from the work table supporting ledge;

(b) a lower component having a substantially identical pair of sidewall elements affixed along the two lateral edges and disposed at right angles of the planar component, each of the side wall elements defining a three-segment planar element with the middle segment being fixed at substantially right angle to a first outer segment at a first end thereof, the first outer segment abutting and being secured to one of the lateral edge skirts of the rigid planar component; the first outer segment further having an elongate inwardly projecting ledge for stabilizing contact with the work tablet ledge; a second outer segment attached to the middle segment at a second end thereof and diverged from the first out segment to present a variable gap between the first outer segment and the second outer segment; an array of abutting linear serrations located along an inner edge of the second outer segment; and (c) a handle member defining a substantially rectangular configuration having opposing elongate sidewalls with an anchoring rigid bar element spanning and connecting with longitudinal ends of the elongate sidewalls at their lower handle end;

(d) a spindle member spanning and connecting the opposing elongate sidewalls and positioned at the upper longitudinal ends thereof and pivotally supported by the elongate opposing sidewalls; and (e) the handle member further including a pair of opposing detent means affixed and directed inwardly of the opposing elongate sidewalls of the handle member located proximal to the spindle member, and aligned to travel along an inner surfaces of the opposing sidewalls in sliding contact with the array of abutting linear serrations located on each of the second outer segments of the sidewall elements.

2. The apparatus of claim 1 wherein each of the opposing detent means is provided with a recessed annular channel which provides the contact surface for the abutting serrations.

3. The apparatus of claim 1 wherein a rigid spanner bar is provided proximal to the upper ends of the handle member offset from the spindle member.

4. The apparatus of claim 1 wherein the detent means of the handle component comprises a rounded knob having a recessed annular channel that contacts the linear serrations of the second outer segment.

5. The apparatus of claim 3 wherein the rigid spanner bar of the handle member presents an L-angle in cross section.

* * * * *

UNITED STATES PATENT AND TRADEMARK OFFICE
CERTIFICATE OF CORRECTION

PATENT NO. : 5,743,502

DATED : April 28, 1998

INVENTOR(S) : Gary Lee Humma

It is certified that error appears in the above-identified patent and that said Letters Patent is hereby corrected as shown below:

In the Specification, on all text pages, the misspelled word "VICE." and "vices" should be corrected to read "VISE", at each of the columns enumerated below:

Title page, column one; line [54[;

Title page, item [57], line 5;

column 1, lines 3, 8, 10, 12, 23, 25, 27, 30, 36, 37, 41, 45, 62, and 64.

column 2; lines 33, 34, and 60 column 3; lines 3, 8, 9, 21, 23, 29, 32, and 67 only.

column 4; lines 15 and 19 column 5; lines 21 and 25

Signed and Sealed this

Fifteenth Day of December, 1998

Attest:

BRUCE LEHMAN

Attesting Officer

Commissioner of Patents and Trademarks